United States Patent [19]

Littman et al.

[11] Patent Number: 4,558,758

[45] Date of Patent: Dec. 17, 1985

[54] PRIME MOVER

[75] Inventors: Erwin J. Littman, 4466 N.-600 W, LaPorte, Ind. 46350; Glen L. Anderson, Ukiah, Calif.

[73] Assignee: Erwin Littman, LaPorte, Ind.

[21] Appl. No.: 557,211

[22] Filed: Dec. 2, 1983

[51] Int. Cl.$^4$ .............................................. B62D 57/02
[52] U.S. Cl. ..................................... 180/8.1; 180/8.3; 180/8.6; 180/9.46; 180/140; 180/236; 182/2; 414/1; 414/694; 414/735; 901/1
[58] Field of Search .................... 180/8.1, 8.2, 8.3, 8.4, 180/8.5, 8.6, 8.7, 9.46, 9.52, 140, 161, 236, 237, 167, 168; 182/2; 212/189; 414/1, 694, 735; 901/1; 114/270

[56] References Cited

U.S. PATENT DOCUMENTS

| | | | |
|---|---|---|---|
| 3,306,390 | 2/1967 | Jamme | 180/8.1 X |
| 3,664,448 | 5/1972 | Hudis | 180/9.46 |
| 3,792,745 | 2/1974 | Files | 180/140 X |
| 3,900,077 | 8/1975 | Gee et al. | 180/9.46 |
| 4,029,165 | 6/1977 | Miller et al. | 180/9.46 X |
| 4,076,131 | 2/1978 | Dahlstrom et al. | 414/735 X |
| 4,096,766 | 6/1978 | Pardo et al. | 414/1 X |
| 4,241,803 | 12/1980 | Lauber | 180/8.1 |
| 4,265,326 | 5/1981 | Lauber | 180/8.1 |
| 4,360,077 | 11/1982 | Abbott | 182/2 |
| 4,395,191 | 7/1983 | Kaiser | 414/694 |
| 4,502,556 | 3/1985 | Bartholet | 180/8.6 |
| 4,503,924 | 3/1985 | Bartholet et al. | 180/8.6 |
| 4,511,011 | 4/1985 | Bartholet | 180/8.6 |

FOREIGN PATENT DOCUMENTS

| | | | |
|---|---|---|---|
| 2915070 | 10/1979 | Fed. Rep. of Germany | 180/236 |
| 742232 | 6/1980 | U.S.S.R. | 180/140 |

*Primary Examiner*—Joseph F. Peters, Jr.
*Assistant Examiner*—Mitchell J. Hill
*Attorney, Agent, or Firm*—Allegretti, Newitt, Witcoff & McAndrews, Ltd.

[57] ABSTRACT

A prime mover having a central body with a plurality of elongated legs pivotally connected to said central body for movement both up and down and sideways and individual steerable drive means on each elongated leg to enable the prime mover to move over a wide variety of terrains. The drive means include ground supporting wheels or tracks. Carried on the prime mover are electro hydraulic control means for steering each of the drive means and electric control means for actuating each of the drive means for moving the prime mover along the ground. A work platform is supported on the central body, which is appropriately levelled and stabilized in work position by proper extension or retraction or vertical depression or elevation of the respective elongated legs. The prime mover has four independently mounted drive means or wheels, unconnected by common axles or mechanical linkage and having no fixed track, that are controlled in such a manner that the geometry of steering produces a coherent effect.

19 Claims, 15 Drawing Figures

PRIME MOVER

BACKGROUND OF THE INVENTION

This invention relates to a prime mover and more particularly, to a prime mover having a plurality of elongated, segmented legs with individual steerable drive means on each so as to enable the prime mover to be easily moved to and positioned properly in a wide variety of environments and terrains.

Four wheel drive mechanisms for vehicles are known. For example, Hudis U.S. Pat. No. 3,664,448 shows a vehicle having legs pivoted horizontally, but not up and down, relative to a frame. Individual wheels or tracks are supported on columns connected to the ends of the legs. Files U.S. Pat. No. 3,792,745 reveals a vehicle having a frame and four separate traction carriages. A vertical post and a horizontally extending leg connect each traction carriage and a corner of the frame. However, to applicant's knowledge, none of these vehicles are intended for variable terrain and multi-purpose usage and none have drive mechanisms mounted on individually actuable elongated legs that are movable both up and down and sideways relative to the frame. Neither Hudis nor Files disclose a vehicle capable of the universal application of the unique prime mover of the present invention.

The present invention contemplates a prime mover comprising a central housing, a plurality of elongated legs, mounting means for mounting the elongated legs on the central housing so as to permit movement of the elongated legs both up and down and sideways relative to the central housing, drive means on each of the elongated legs, and control means for independently actuating the drive means for moving the central housing on the ground, the elongated legs being adapted to be positioned so as to stabilize the orientation of the central housing. The elongated legs are preferably provided with telescoping sections so as to selectively increase the length of the legs and increase stabilization of the work platform. The drive means includes a king pin or shaft, frame means affixed to the king pin or shaft, and ground support means or wheels journaled for rotation on said frame means, the frame means being rotatable about the axis of the king pin or shaft and the ground support means being rotatable about a generally horizontally disposed axis. The drive means are selectively controlled for independent or conjoint operation and the drive means may be actuated as desired, without regard to the position of the elongated stabilizing legs.

An object of the present invention is to provide a prime mover with a plurality of articulated elongated legs that are movable up and down, sideways, and in and out relative to a central housing and each having individual drive means thereon to enable the prime mover to be positioned as desired in a variety of environments.

Another object of the present invention is to provide a prime mover with a plurality of universally actuable legs, each of which has separately actuable drive means thereon, the drive means each being rotatably journaled about a generally vertical axis so as to more easily position the prime mover for use on a variety of terrains.

Yet another object of the present invention is to provide a prime mover having a plurality of legs mounted for movement up and down, side ways, and in and out relative to a central housing, separately actuable drive means on each leg comprising drive wheels and a drive motor, and control means for actuating the drive motors and for steering the drive wheels.

A further object of the present invention is to provide a prime mover that has four independently mounted drive means or wheels, unconnected by common axles or mechanical linkage and having no fixed track (that is, wheels located at fixed distances and angles from a given point), which are controlled in such manner that the geometry of steering produces a coherent effect. Other objects and advantages of the present invention will be made more apparent hereinafter.

BRIEF DESCRIPTION OF THE DRAWING

There is shown in the attached drawing a presently preferred embodiment of the present invention, wherein like numerals in the various views refer to like elements and wherein.

DESCRIPTION OF THE PREFERRED EMBODIMENT

Figure 1:
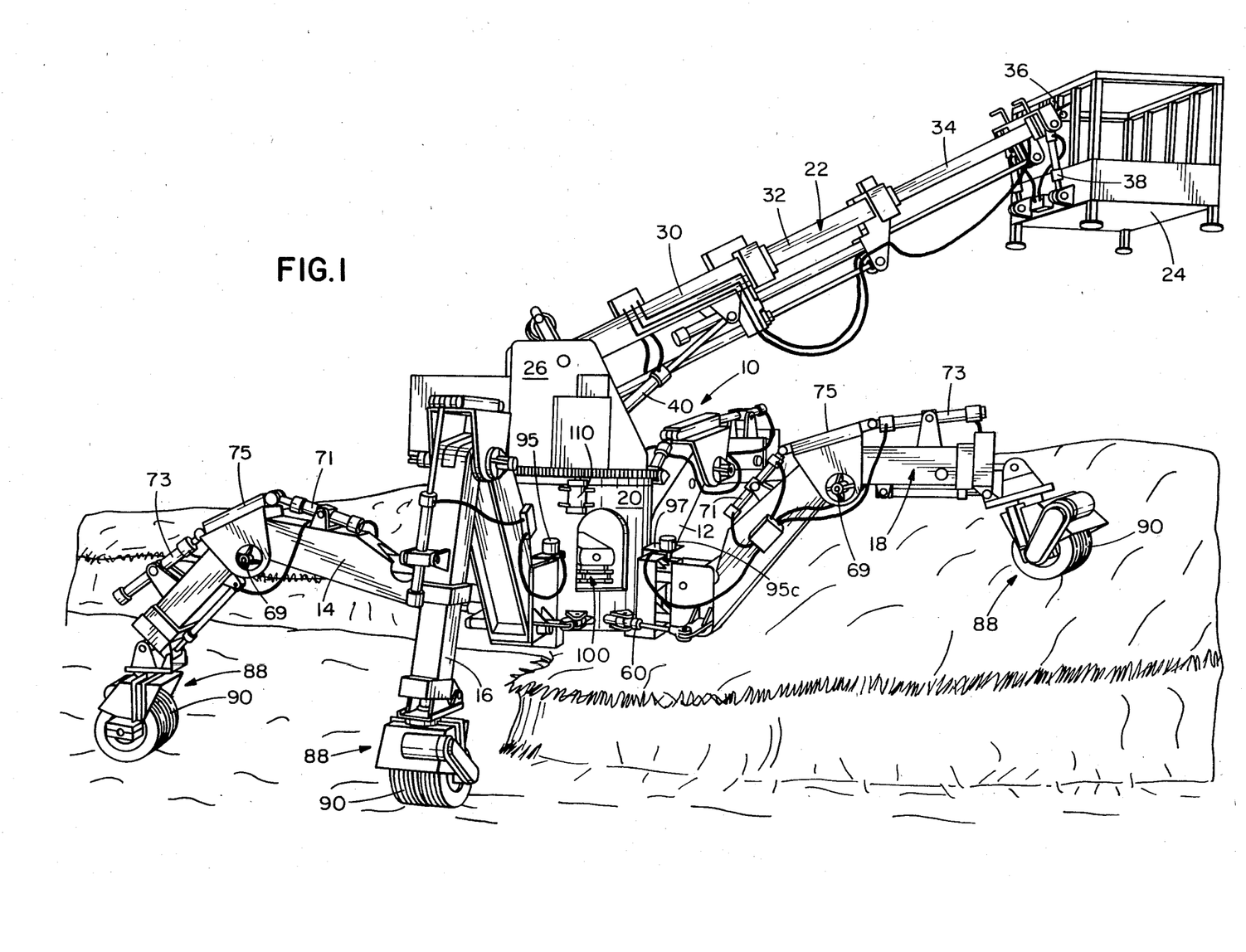
FIG. 1 is a perspective view of a prime mover illustrated in use on hilly or uneven terrain, with each of the legs at least partially extended.

With reference to FIG. 1, there is shown a prime mover 10 in position in a field environment, with each of the four elongated leg means 12, 14, 16 and 18 in at least partially extended position so as to stabilize the prime mover and to level the work platform of the prime mover for use. The prime mover 10 includes a central body or housing 20 to which each of the legs 12, 14, 16 and 18 is universally connected for both sideways movement and up and down movement.

Secured to the central body or housing 20 in the illustrated embodiment of prime mover 10 is a work platform or frame 26 carrying elongated boom means 22 having a basket or carrier 24 connected to an end thereof. The boom means 22 are pivotally connected to work platform or frame 26 that is rotatably carried on the central body 20. The boom means 22 include telescoping cylinder means 30, 32 and 34, which are extensible and retractable so as to properly position operating means carried on the end thereof. In the illustrated embodiment, the operating means comprise a basket 24 pivotally connected to the end of the cylinder means 34 about a pivot means 36. Actuator 38, connected to the cylinder means 34 and to basket 24, may be extended or retracted to desirably position the basket 24.

The boom means 22 are pivotable relative to the frame 26 by means of an actuator 40. The actuating means to extend the cylinder 30, 32, 34, the actuator 38 and the actuator 40 are hydraulic. While for purposes of more fully illustrating a presently preferred embodiment of the invention, I have illustrated a work platform having boom means with a carrier thereon, it will be apparent the work platform may be adapted for a variety of work devices, including, for example, a winch and loadline for hoisting material or a fork lift or a man basket.

The leg means 12, 14, 16 and 18 are each comprised of a plurality of sections which are pivoted one to another. The leg means 18 better shown in FIGS. 2 and 3 comprise an innermost or first section 44 pivoted about pivot means 46 for movement sideways of the central body 20. The pivot means 46 comprise upper and lower pivot pins or hinge pins 47 and 48 joining together brackets 50, 52 on the central body 20 and journals 54, 56 on the support or carrier 58.

Figure 2:
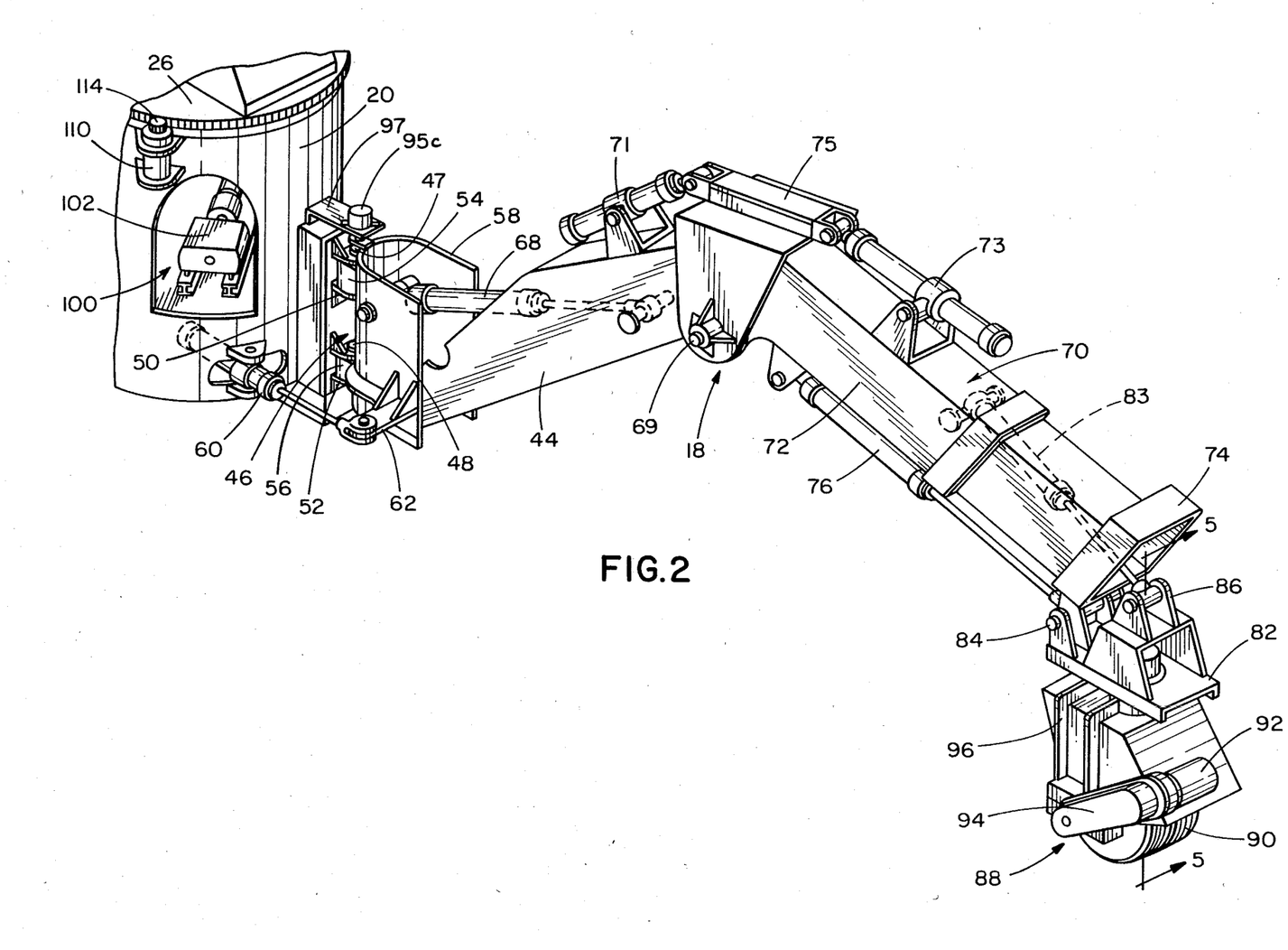
FIG. 2 is an enlarged view illustrating the connection of one elongated leg to the central body of the prime mover.
Figure 3:
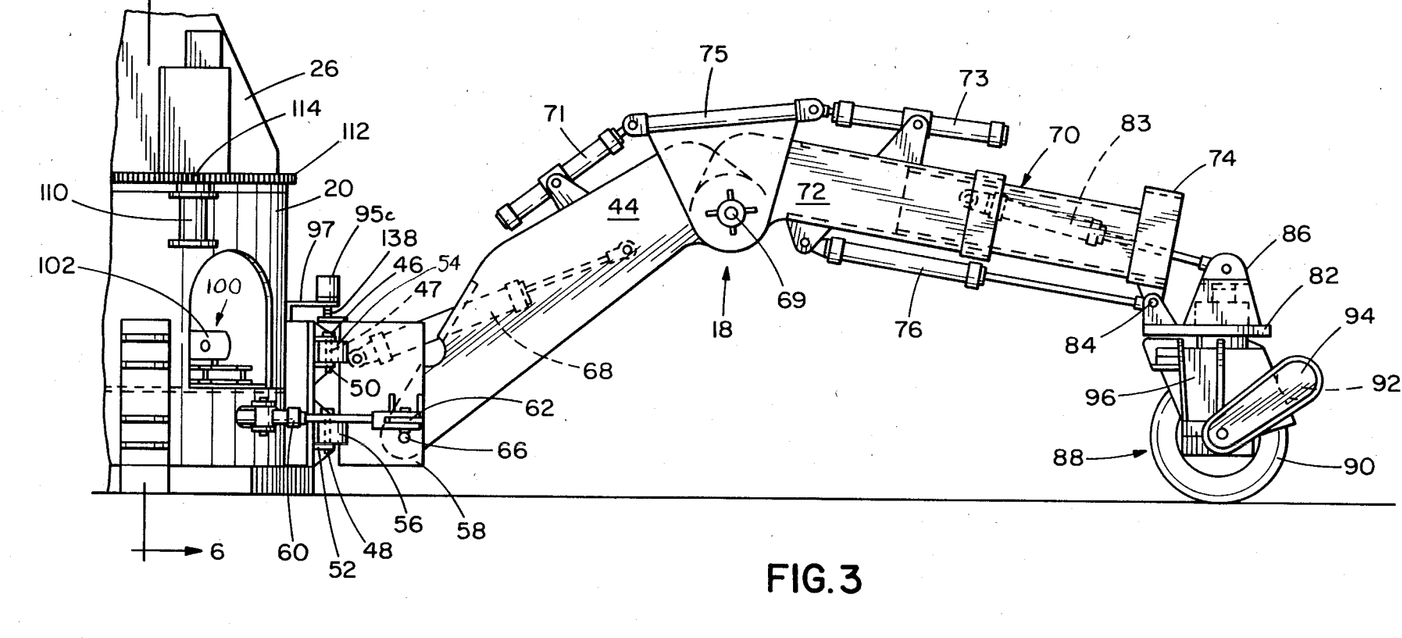
FIG. 3 is a side view of the elongated leg of FIG. 2.

The actuating means 60 for moving the leg means 18 sideways comprises piston and cylinder means connected between the central body 20 and the projecting bracket 62 on the side of carrier 58. As the carrier 58 is rotated about pivot means 46, so is first section 44 and the rest of the leg means.

The first section 44 of leg 18 is pivotally connected to support 58 at pivot 66. Actuating means 68 comprising cylinder and piston means is connected between the support 58 and the first section 44. By extending and contracting actuating means 68, the first section 44 can be lowered and raised relative to the central body 20 or moved between extended and retracted positions relative to the central body 20. Section 44 is formed as a box-like member with opposed pairs of sides and is open at the ends.

Second section 70 of leg 18 comprises an outer box-like member 72 and a telescoping box-like member 74 cooperating therewith. Section 70 is pivoted to section 44 about pivot 69. Actuating means 71 and 73 cooperate to articulate sections 44 and 72 with respect to one another about pivot 69. Actuating means 71 includes a cylinder pivotally connected intermediate its ends to section 44 and a rod pivotally connected at an end to bracket 75. Actuating means 73 includes a cylinder pivotally connected intermediate its ends to section 72 and a rod pivotally connected at an end to bracket 75. Piston and cylinder means 76 is connected at one end to the member 72 and at the other end to the member 74 for telescoping or moving members 72 and 74 relative to one another.

The outer section 82 of the stabilizer leg 18 is pivotally connected to member 74 by pivot means 84. The actuating means 84 for pivoting the outer section 82 relative to second section 70 comprises hydraulic piston and cylinder means connected at one end to member 74 and at the other end to bracket 86 on outer section 82. While certain of the actuating means cylinders are shown connected at an end and other connected intermediate the ends thereof, it will be apparent that either arrangement may be employed.

Drive means 88 are carried on the outer section 82 of leg 18. The drive means 88 include wheel means 90 journaled for rotation about a generally horizontal axis. Motor means 92, which may be hydraulic or electric but are preferably electric, are connected to the wheel axle by suitable gearing, gear reducers, chains, or like connecting means 94 for rotating the wheel means 90. The wheel means 90 may be a single wheel or dual wheels or, if desired, tracks may be used in place of the wheels. The term "wheel means" therefore is intended to include both forms of ground engaging and supporting devices.

The drive means 88 include a housing 96 that is supported on the outer section 82 for rotation about a generally vertical axis. Thus, the wheel means 90 may be rotated about a generally horizontal axis, through axle shaft 120 (See FIG. 6), as well as about a generally vertical axis through king pin or shaft 124 so as to move the prime mover in almost any direction, as will be described more fully hereafter.

A synchro mechanism 95, 95a, 95b and 95c (FIGS. 1-3 and 14) is mounted on the bracket 97 secured to the body or housing 20. When carrier 58 rotates about hinge pins 47, 48, the armature within each synchro mechanism 95, 95a, 95b and 95c rotates the same number of degrees. The rotation of the armature measures electrically the number of degrees that the carrier 58 increases or decreases the angle of the legs in relation to the designated longitudinal center line of the prime mover 10. Each leg 12, 14, 16, 18 has a synchro mechanism or synchro differential transformer 95a, 95b 95 and 95c so mounted.

Provided within the central body 20 is a motor drive 100 for actuating the prime mover 10. The prime mover motor drive 100 may comprise an internal combustion engine 102 operatively connected to hydraulic pump means 104. Suitable lines, not shown, connect the hydraulic pump means 104 with the various hydraulic actuating means on the prime mover 10 and to reservoirs or tanks 107 (FIG. 8) suitably mounted in opposed relationship on the exterior of the central body 20. The preferred actuating means are hydraulic. Generator 105 driven by engine 102 provides the main electric power for the prime mover electrical components.

Drive motor 110 secured to the central body 20 is operatively connected to ring gear 112 on frame 26 by gear 114. Rotation of gear 114 by motor 110 will drive ring 112 and frame 26 to position the frame 26 and any operating means carried thereon, for example, boom means 22, as desired. These components may be reversed, if desired. The drive motor 110 may be mounted on frame 26 and the ring gear may be mounted on body 20.

Figures 4, 5, 6:
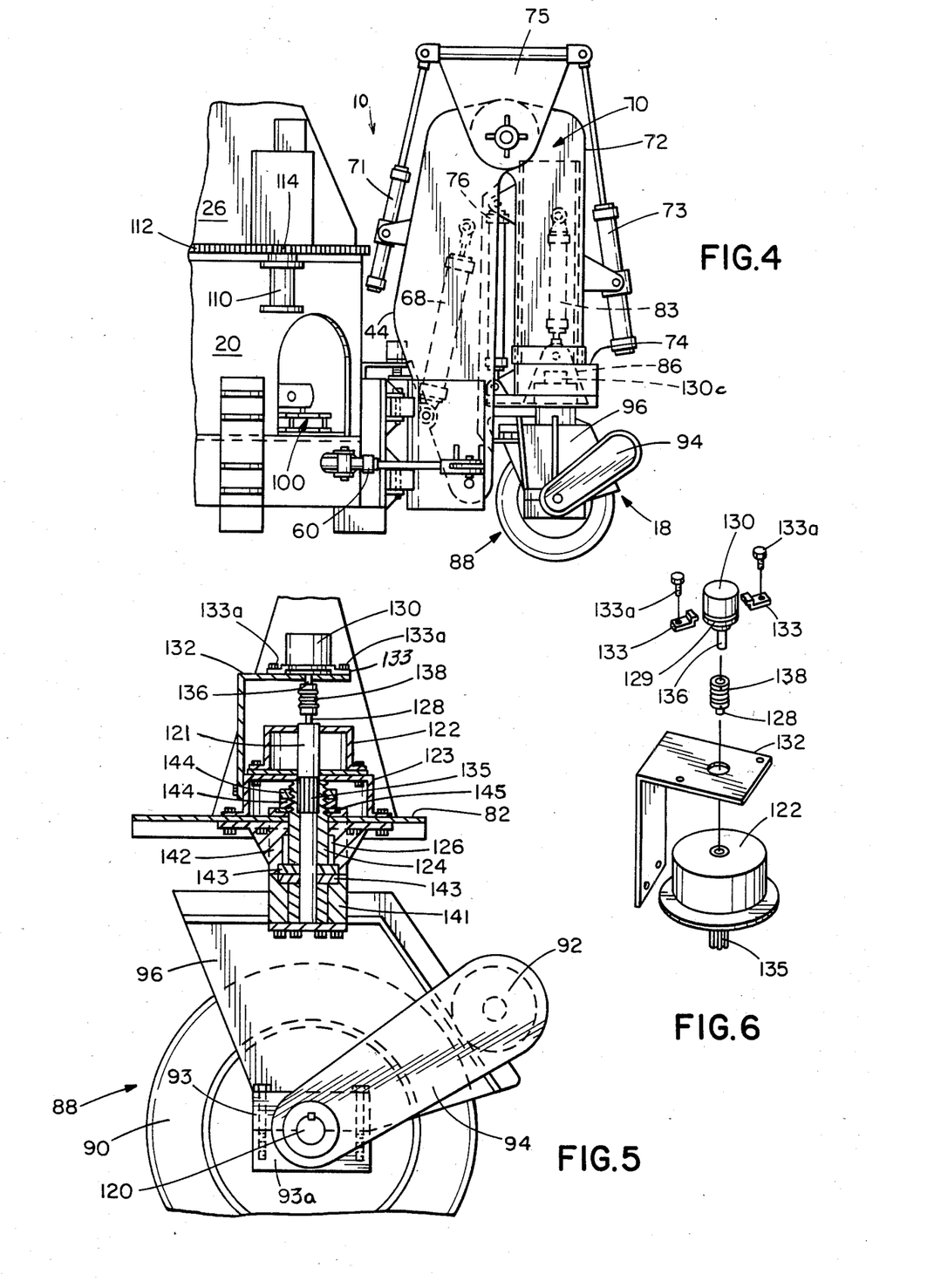
FIG. 4 is a side view of the prime mover illustrating one leg in the fully retracted position.
FIG. 5 is a cross-sectional detail view of a drive means taken generally along the line 5—5 of FIG. 2.
FIG. 6 is an exploded perspective view illustrating the connection between a hydraulic rotary actuator and associated synchro.

Turning now to FIG. 4, there is illustrated the fully retracted position of stabilizer leg 18. Actuating means 68 is fully retracted so as to pivot section 44 into a generally vertical position as shown in FIG. 4. Actuating means 76 is retracted fully so as to draw section 74 fully into section 72. Actuating means 71 and 73 are fully extended. Actuating means 83 is fully retracted so that drive means 88 lie under outer section 70 of leg 18.

The drive means 88 may be rotated about its vertical pivot axis so as to desirably move the prime mover 10. With all four stabilizer legs 12, 14, 16 and 18 retracted, and the front legs adjacent to one another and the rear legs adjacent to one another, the prime mover 10 has a narrow width to enable it to maneuver in tight quarters, for example, through a relatively narrow doorway in a building.

With reference to FIG. 5, there is better shown the mounting of the drive means 88 on the outer section of stabilizer leg 18. The axle 120 for wheels 90 is journaled in pillow blocks 93, 93a operatively secured to housing 96, and the axis through axle 120 may be called a drive axis. Upper pillow block 93 is secured to housing 96 and the lower pillow block 93a is demountable. Motor 92 and gear reducer train 94 are mounted on housing or wheel guard bracket 96. Extending upwardly from the bracket 96 and fixed thereto is a hollow king pin 124. King pin 124 is journaled in bearing 126 carried in journal 142. King pin 124 is rotated by hydraulic rotary actuator 122 secured thereto, for example, by a key or spline arrangement. The axis through shaft 124 may be called a steering axis. Actuator 122, which may be hydraulic, is secured to bracket 123 by suitable fasteners. The bracket 123 also functions as a dust cover to protect the upper end of the journal and king pin. Stub shaft 128 is screwed into the upper end of the rotary actuator 122. A synchro control transformer mechanism 130 is mounted on mounting bracket 132. The shaft 136 depending from synchro mechanism 130 is operatively connected to stub shaft 128 by bellows connection 138. The bellows connection 138 provides a flexible connection between shafts 128 and 136. The synchro mechanism 130 will electrically measure the number of degrees of rotation of the wheel means 90 about the axis of shaft 124.

The operating shaft 121 of the hydraulic actuator 122 extends completely through the housing of actuator 122 and is suitably sealed to the housing. The lower end of operating shaft 121 is defined by an externally splined shaft 135, which is adapted to slidingly engage and cooperate within an opening having complementary internal splines in the upper end of king pin 124 for driving same. The rotating power furnished by the rotary actuator 122 will be transmitted through the king pin 124 to steer the wheels 90. The king pins 124 are adopted to be automatically directed to a parallel mode in relation to the center line of each leg or at a 90° angle in relation to the center line of each leg, as more fully explained hereafter. The top of operating shaft 121 may be suitably bored and tapped for receiving shaft 128. This boring and tapping is provided on all models by the manufacturer unless specified otherwise.

Bracket 96 includes an upper bracket member 141 integrally secured thereto. Disposed between the bracket member 141 and journal 142 are washer-type thrust bearings 143. Two lock nuts 144 are fastened to external threads at the upper end of king pin 124. The lower lock nut 144 abuts the upper washer type thrust bearing means 145. Preferably, the bearing means comprises two thrust bearings 145 in juxtaposed relationship.

When lock nuts 144 are tightened into place, they allow the two lower thrust bearings 143 a small space, on the order of 0.003 of an inch, to receive lubricant via a grease fitting (not shown). The thrust bearings 143 take the load of the prime mover 10, yet allow the wheels 90 to turn. Lock nuts 144 fasten the wheel assembly to bracket 83 and prevent disassembly in the event the supporting leg and the drive means 88 are lifted above the terrain. Also, the lock nuts 144 allow space between the faces of the two lower thrust bearings 143.

FIG. 6 is an exploded view of the synchro connection to the rotary actuator for turning the wheels 90 about the axis of the king pin 124. The body of the synchro control transformer 130, which functions as a control transformer in the control means for steering the prime mover 10, is provided with an annular groove 129. Synchro hold down clamps 133, which are detachably secured to bracket 132 by fasteners 133a, include projections which engage within the groove 129 for retaining the synchro 130 in position on bracket 132. The two clamps 133 are disposed diametrically from one another. The synchro control transformer 130 may be rotatably adjusted by loosening clamps 133, rotating the synchro control transformer 130 to desired position, and then tightening the clamps 133.

The bellows coupling 138 is fixed by a set screw or like fastener to the shaft 136 extending from synchro control transformer 130 and to the shaft 128 extending upwardly from hydraulic rotary actuator 122.

Figure 7:
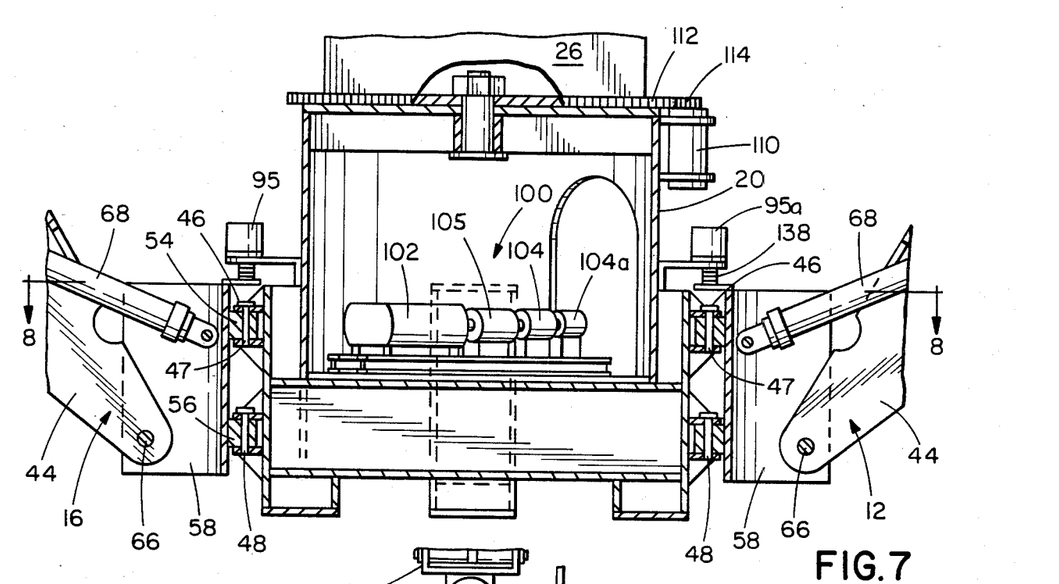
FIG. 7 is a cross sectional view through the central body of the prime mover, illustrating the connection of two legs to the central body.
Figure 8:
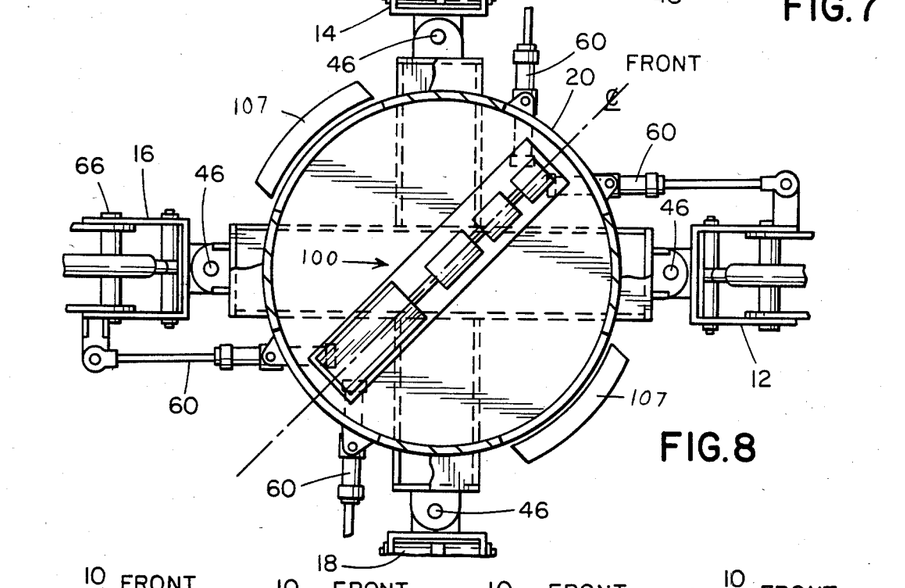
FIG. 8 is a cross-sectional view through the central body of the prime mover, taken generally along the line 8—8 of FIG. 7.

Turning to FIGS. 7 and 8, there is better illustrated the central body 20 and the connection of the stabilizer legs to the central body. For convenience, the components of the legs 16 and 12 will be designated with the same numerals as used in connection with the leg 18 in FIGS. 2 and 3. The inner sections 44 of each of the legs 16 and 12 is rotated vertically or about generally horizontally disposed pivot pins 66 in the carriers 58. Each carrier 58 is pivoted sidewise relative to the central body 20 about pivot means 46 which comprise upper and lower pivot pins 47 and 48, respectively. The pivot means 46 connect brackets on the central body 20 with projections 54, 56 connected to each of the carriers 58. Upon actuation of cylinder and rod actuating means 60, each of the legs 12, 14, 16 and 18 may be pivoted about its pivot means 46, individually or in any combination.

Housed within the central body 20 is a motor drive 100, which may comprise an internal combustion engine 102 operatively connected to hydraulic pump means 104, which is the source of hydraulic pressure for all hydraulic cylinders and pistons on the legs. Also driven by internal combustion engine 102 is hydraulic pump 104a, which provides hydraulic pressure for all steering components.

The internal combustion engine 102 may be provided with an auxiliary A.C. alternator driven by belts or the like drive means from the internal combustion engine 102 as a source of electric power for the electrical components of the steering system and to charge batteries. A generator 105 driven by the engine 102 is the main source of power for each of the drive motors 92.

As noted earlier, the frame means 26 and drive means comprising the drive motor 110, gear 114 and ring gear 112 on the frame 26 are shown for illustrative purposes. It will be understood that other working platforms may be substituted for the frame 26 and boom means 22 shown in FIG. 1.

With reference to FIG. 7, each of the stabilizer legs is provided with a synchro differential transformer 95 which provides an electrical signal in response to movement of each leg relative to the designated longitudinal center line of the prime mover 10.

Figure 9:
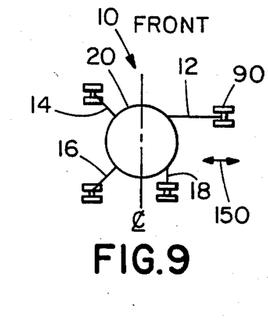
FIG. 9 is a schematic view of the prime mover, illustrating the position of the wheels for sideways movement relative to the center line of the primer mover.

Turning to FIGS. 9, 10, 11 and 12, there is illustrated schematically various movement positions of the prime mover 10. FIG. 9, for example, shows the prime mover 10 in the parallel steering mode. Each of the wheels 90 is oriented in parallel relationship, with the axes of rotation of the wheels parallel to the plane of the page. In this alignment of wheels 90, the prime mover 10 may be moved left or right relative to the center line of the prime mover. Further, simply by reversing the drive motors, the prime mover 10 may be moved toward any point of the compass. It will be observed that the prime mover 10 may be moved left or right or towards any point of the compass whether the legs 12, 14, 16 and 18 are in the fully retracted position, in the fully extended position, or in any intermediate position, or any sideways position relative to the longitudinal axis, even beyond 90 degrees. The mode of steering shown in FIG. 9 is preferred when the primer mover 10 is in a working position with a load on its work platform and its supporting or stabilizer legs extended at different distances and angles.

Figure 10:
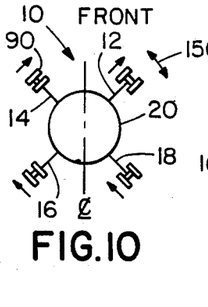
FIG. 10 is a schematic view of the prime mover, illustrating the position of the wheels for opposed steering or circular movement around the centerpoint of the prime mover.

In FIG. 10, there is shown the orientation of the wheels for movement of the prime mover 10 in the opposed steering mode. The small arrows adjacent each of the wheels 90 indicates the direction of rotation of the wheels and the arrow 150 indicates the clockwise rotation of the prime mover. This mode of steering allows the primer mover 10 to turn in a minimum radius.

Figures 11, 12:
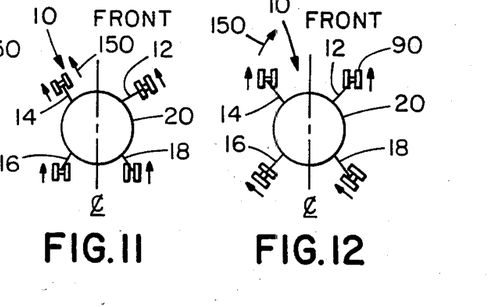
FIG. 11 is a schematic view of the prime mover illustrating the position of the wheels for front wheel steering only.
FIG. 12 is a schematic view of the prime mover, illustrating the position of the wheels for rear wheel steering only.

In FIG. 11, there is shown the position of the wheels 90 for the front wheel only steering mode of the prime mover 10. As illustrated, the wheels 90 on legs 16 and 18 are disposed in parallel relationship with one another and with the center line of the prime mover 10. The wheels 90 on legs 12 and 14 are parallel to one another and each is at angle relative to the center line of the prime mover 10. Upon actuation of the drive motors for each of the wheels 90 in the direction indicated by the arrows adjacent each wheel 90, the prime mover 10 will move in the direction shown by arrow 150. This mode of steering is desirable when the stabilizer legs are folded as in FIG. 4 and the prime mover 10 is being manuevered in narrow spaces. By reversing the drive motors, the prime mover would steer in the reverse direction of arrow 150.

FIG. 12 illustrates positioning of the wheels 90 for the rear wheel only steering mode of the prime mover 10. Upon actuation of the drive motors for each of the wheels 90 in the direction indicated by the arrows adjacent each wheel 90, the prime mover 10 will move in the direction shown by arrow 150. The rear wheel only steering mode and the front wheel only steering mode may be used by the operator to navigate the prime mover 10 in tight quarters.

From FIGS. 9, 10, 11 and 12, it should be apparent that the prime mover 10 is susceptible to a wide variety of movements. Drive means on the ends of each of the legs are actuable regardless of the positions or extensions of the stabilizer legs so as to move and position the prime mover as desired. Retraction or extension of the legs 12, 14, 16 and 18 relative to body 20 or the angle of the legs from the center line of the body is not important in steering.

Figure 13:
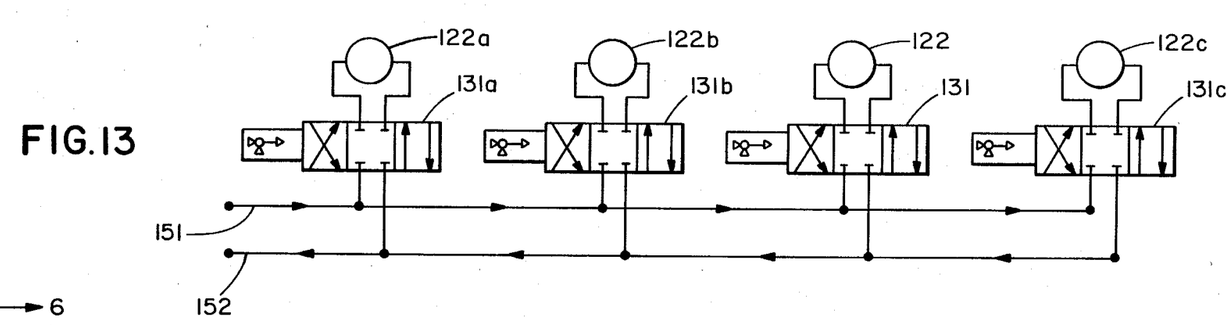
FIG. 13 is a hydraulic schematic for the actuators for steering the drive wheels of the prime mover.
Figure 14:
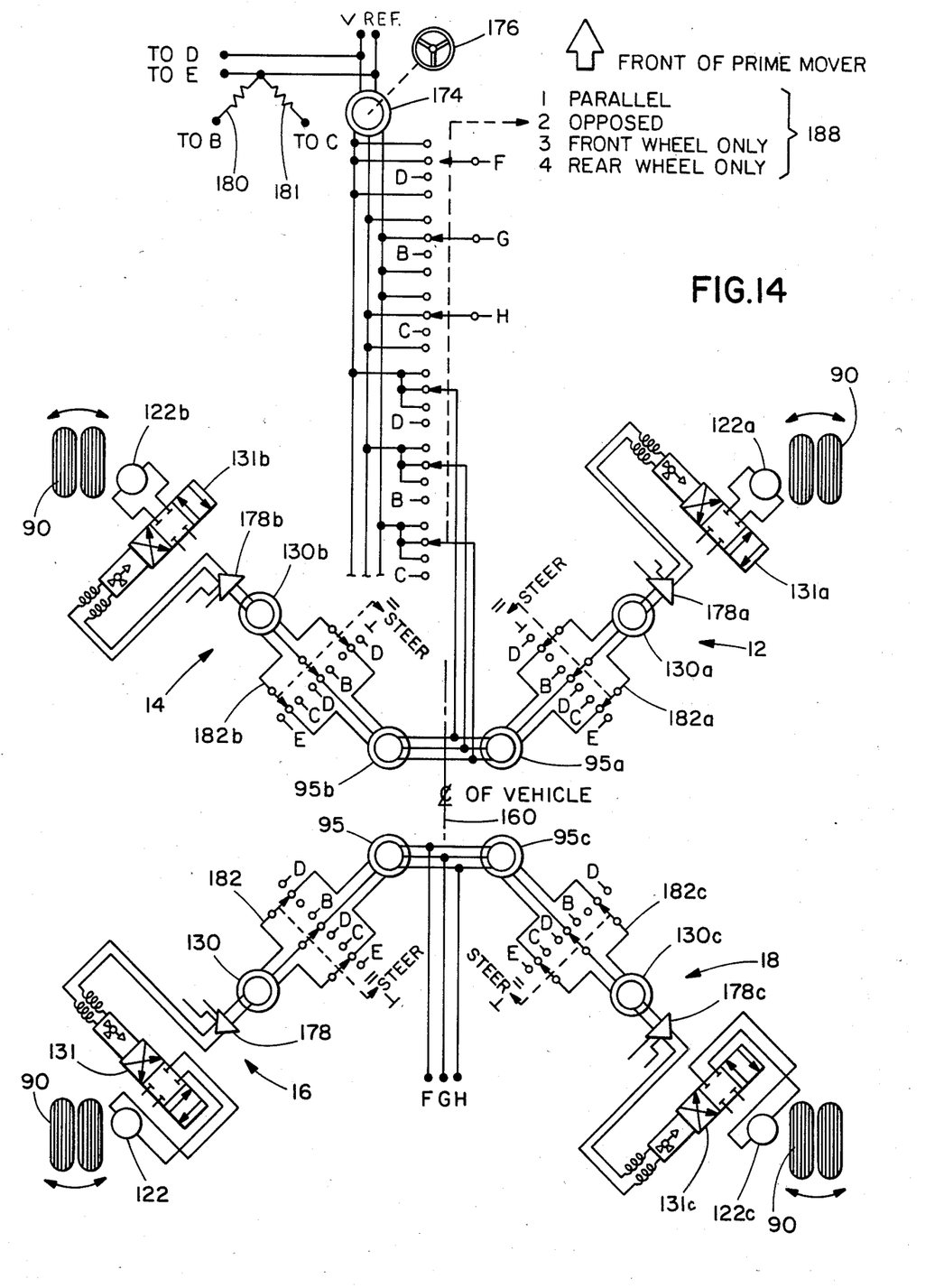
FIG. 14 is an electrical schematic of the control means for steering the drive wheels of the prime mover, with the wheels shown in position to move the prime mover along its longitudinal center line.
Figure 15:
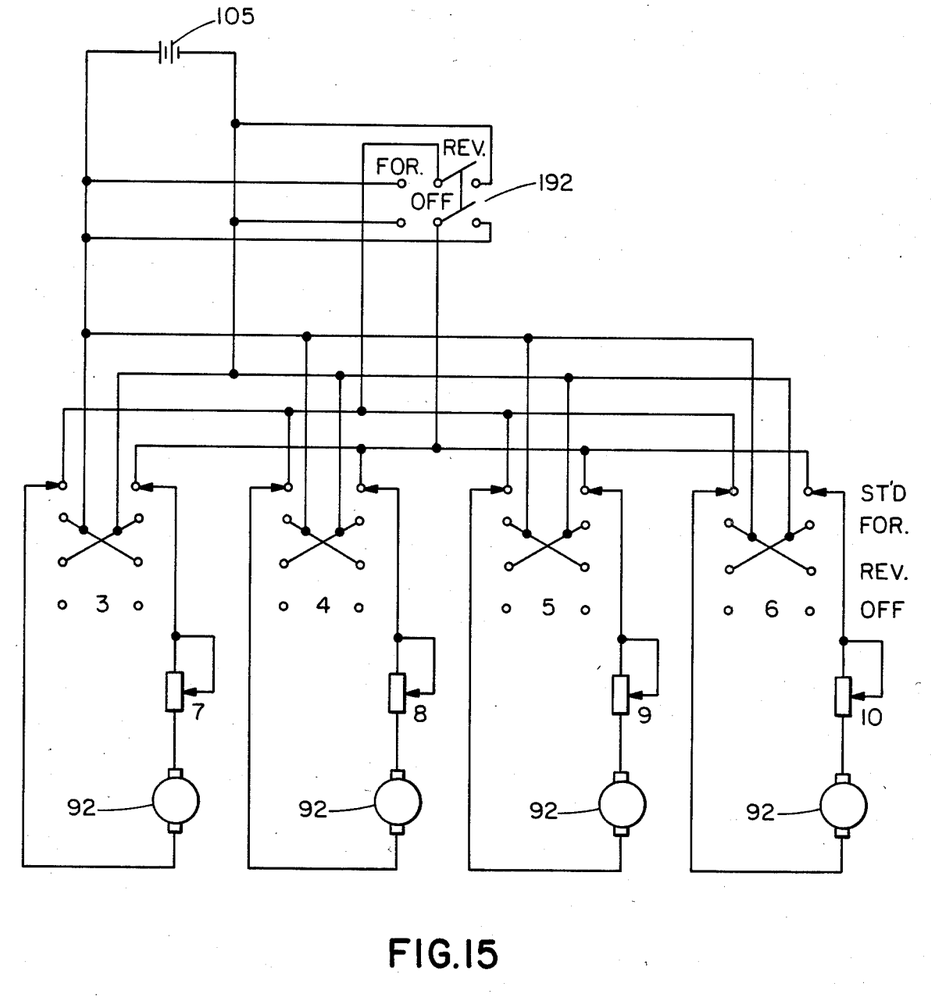
FIG. 15 is an electrical schematic of the control means for actuating the drive wheels of the prime mover.

The control means for actuating the primer mover 10 are shown in FIGS. 13 14, and 15 respectively. The hydraulic circuit shown schematically in FIG. 12 includes lines 151 and 152. Line 151 communicates with the hydraulic pump means 104a and line 152 communicates with the reservoir tank 107 (FIG. 8) on the central body 20. Associated with each stabilizer leg 12, 14, 16 and 18 is a hydraulic rotary actuator 122a, 122b, 122 and 122c, respectively. Each hydraulic rotary actuator is associated with a king pin 124 for rotating the wheels 90 about the axis of the king pin. Operatively connected to each hydraulic rotary actuator 122a, 122b, 122 and 122c is a hydraulic servo valve 131a, 131b, 131 and 131c.

Turning now to the control schematic of FIG. 14, there is shown the interrelationship of the hydraulic mechanisms and the electronic mechanisms for operating the prime mover 10. An arrowhead in the upper part of FIG. 14 indicates the front of the prime mover. The center line of the prime mover 10 is designated by the line 160 in FIG. 14. The hydraulic actuators 122a, 122b, 122 and 122c are shown on the respective stabilizer legs 12, 14, 16 and 18. The steering function is provided through the hydraulic rotary actuators 122a, 122b, 122 and 122c which are connected to the king pins 124 on each of the wheels 90, which are controlled in turn by individual hydraulic servo valves 131a, 131b, 131 and 131c, respectively. The hydraulic servo valves 131a, 131b, 131 and 131c are connected to individual synchro systems.

Each of the stabilizer legs 12, 14, 16 and 18 contains a synchro differential transformer 95a, 95b, 95 and 95c, respectively. The synchro differential transformers are responsive to sidewise movement of the stabilizer legs. Further, each arm 12, 14, 16 and 18 contains a synchro control transformer 130a, 130b, 130 and 130c, respectively. The control transformers are responsive to rotation of the wheels 90 about the king pin. The synchro differential transformers and synchro control transformers cooperate to position the wheels 90 to the commanded position independent of the position of the stabilizing legs 12, 14, 16 and 18, respectively.

In the four-wheel parallel steering mode of operation, the steering command comes from the synchro transmitter 175 which is operatively connected to the steering wheel or steering command 176. The signal is directed to the four synchro differential transformers 95a, 95b, 95 and 95c, which are located at the pivot points of the stabilizing legs 12, 14, 16 and 18, respectively, and then to the four synchro control transformers 130a, 130b, 130 and 130c, which are located at the wheels. The synchro differential transformers 95a, 95b, 95 and 95c add or subtract the leg position angle from the steering command angle to provide a signal to the wheel synchro control transformers 130a, 130b, 130 and 130c, which is independent of the position of the stabilizing legs. When the wheels 90 are driven to the correct position by the hydraulic rotary actuators 122a, 122b, 122 and 122c, the output of the rotor of the synchro control transformers 130a, 130b, 130, and 130c is brought to the null, that is no output, and the positioning servos are commanded to stop. Phase sensitive demodulators and amplifiers 178a, 178b, 178 and 178c are connected to the synchro control transformer rotors of synchro control transformers 130a, 130b, 130, and 130c, which compare the output of the rotors to the reference voltage fed to the control transmitter 174 to produce an output dependent on the amplitude and the phase of the rotor error signals. These errors are fed to the hydraulic servo valves 131a, 131b, 131 and 131c which control the flow of hydraulic fluid to the hydraulic rotary actuators 122a, 122b, 122 and 122c and thereby control the position of the wheels 90. At null, the synchro control transformers 130a, 130b, 130 and 130c produce no output, which results in no output from the phase sensitive demodulators and amplifiers 178a, 178b, 178 and 178c. This results in no hydraulic fluid flow from the hydraulic servo valves 131a, 131b, 131 and 131c and thereby no change in the wheel position of all four wheels. Simply by reversing the voltage and current flow to the drive motors 92, the prime mover 10 can be steered towards any point of the compass in this mode.

In the front wheel only steering mode of operation of the prime mover 10, a fixed resistor network 180, 181 is used to provide a straight ahead steering command for the rear wheels, while the standard steering command is fed to the front wheels as in the parallel steering mode.

A rear wheel steering only mode may be accomplished in the following manner. A fixed straight ahead reference is applied to the front wheels from the resistor network 180, 181 and a reversed steering command is applied to the rear wheels. In this mode, the front wheels are commanded to the straight ahead position and the rear wheels are driven opposite the steering command to provide vehicle steering in the same direction as the steering command.

Four wheel opposed steering may be provided by electrically reversing the stator signal of the synchro transmitter 174 before it is applied to the synchro control differential transformers 95 and 95c on the rear legs, and providing reverse rotation of the steering command signal, that is, a counterclockwise wheel rotation with a clockwise actuation of the synchro transmitter 174.

Switch 188 provides a means of switching between these basic modes of operation, or stated somewhat differently, switch 188 selects the modes of operation. Position 1 of switch 188 is for parallel operation. Position 2 of switch 188 is for opposed operation. Position 3 of switch 188 is for front wheel only operation. Position 4 of switch 188 is for rear wheel only operation.

Two other wheel positioning functions are provided by the switches 182a, 182b, 182 and 182c. These switches provide wheel positioning signals for vehicle stabilizing leg configuration changes. In one mode, switching to "=" position, the switches provide a wheel position parallel to the leg position allowing length adjustment of the leg while the wheel is on the ground and supporting the vehicle and its load. By providing the straight ahead reference signal used for front wheel steering from the resistor network 180, 181 to the control transformers 130a, 130b, 130 and 130c on the wheels, a steering command parallel to the stabilizer legs is provided and the wheels are driven to this position. Once the switch is moved to the position "=", the rotary actuator will not stop at any midway point. To return to any other steering mode, the switch is moved to the "steer" position and the rotary actuator returns to a position synchronized to the other three wheels and the steering mode then in use.

In the second mode, the wheels are positioned perpendicular to the stabilizer legs so as to allow the legs to pivot while the legs are on the ground supporting the prime mover and its load. By providing the reference voltage signal from contacts D and E of the switches 182a, 182b, 182 and 182c, a command signal perpendicular to the stabilizer leg is generated and the wheel assumes this position as explained above. This command is provided by switching the 182a, b, c, and d switches to the "⊥" position, as shown in FIG. 13. Once the switch is moved to the "⊥" position, the rotary actuator will not stop at any midway point. To return to any other steering mode, the switch is moved to the "steer" position and the rotary actuator returns to a position synchronized to the other three wheels and the steering mode then in use.

To initially align the control system, the following steps are taken. With the unit assembled and operational, the four wheel mode selector switches 182a, 182b, 182 and 182c are set to the parallel (=symbol in FIG. 14) mode. With this done, the synchro clamps 133 (FIG. 6) on the wheel synchro control transformers 130a, 130b, 130 and 130c are loosened and the bodies of the synchro control transformers are rotated until the wheels are driven by their respective hydraulic rotory actuators to a position parallel with the leg to which it is attached. The synchro clamps 133 are then tightened to fix the synchro control transformers in place. When this has been done, the wheels are set to straight ahead when a straight ahead command is provided by the resistor network 180, 181.

In order to correctly adjust the rear wheels, set the mode switches 182a, 182b, 182 and 182c to the "steer" mode and set the steering switch 188 to front wheel steering only. The synchro clamps 133 on the rear wheel synchro differential transformer 95 and 95c are loosened and the bodies of the synchro differential transformers which control the rotation of the respective wheels clockwise or counterclockwise are rotated until the rear wheels 90 are aligned straight ahead with reference to the designated longitudinal axis 160 of the prime mover. Upon tightening of the synchro clamps 133, the rear wheels are correctly set.

The final step in alignment is to set the switch 188 to rear wheel steer only and loosen the synchro clamps 133 (FIG. 6) on the front wheel synchro differential transformer synchros 95a and 95b and align the front wheels to straight ahead by rotating the body of the synchro differential transformers clockwise or counterclockwise so that the front wheels are parallel to the designated longitudinal axis 160 of the prime mover. The synchro clamps 133 (FIG. 6) are then tightened. The prime mover 10 is ready to use the steering synchro system in any mode by switching the switch 188 to the desired steering mode and rotating the rotor of the synchro steering transmitter 174 in either a clockwise or counterclockwise direction as the operator may choose. This results in synchronized steering in any direction with a combination of rotation of switch 188 and a forward or reverse switching of the drive motors.

A few examples will demonstrate the versatility of the prime mover 10. With the switch 188 in position 1, the parallel position, and switches 182a, 182b, 182 and 182c in the steer position, as the power to turn the wheels in one direction or another is given by the steering command synchro 174, all four wheels are turned an equal number of degrees in relation to the longitudinal center line 160 of the prime mover, regardless of the angle or distance of the stabilizer legs and the wheels from the center of the prime mover or from the prime mover designated longitudinal center line.

With switch 188 in any steering position, and switches 182a, 182b, 182 or 182c in perpendicular position, that is, the wheel perpendicular to the associated stabilizer leg, the operator can actuate the wheels to a perpendicular relation to its stabilizer leg by engaging the switch 182a, 182b, 182, or 182c controlling the selected leg 12, 14, 16 or 18, and the wheels will automatically seek and stop at a 90° angle relative to the center line of the elongated leg.

The elongated stabilizer legs 12, 14, 16 and 18 may be moved individually or in unison so as to more readily move over or be positioned as desired upon uneven terrain. The legs 12, 14, 16 and 18 may be retracted as shown in FIG. 4 to provide a compact prime mover. With legs 12, 14 and 16, 18, respectively, drawn together in pairs and with each leg being retracted, the width of the prime mover 10 is little more than the outside diameter of the central body. The prime mover 10 is thus able to negotiate relatively narrow paths, roads, or doorways in buildings.

Turning to FIG. 15, there is shown a wiring schematic for the electric controls for the drive motors 92. Power is supplied from a D.C. generator 105. If desired, a three phase alternator may be substituted for the D.C. generator. Power from the alternator will be changed to D.C. using a silicon controlled rectifier. Switch 192 is a double pole, double throw switch, which provides the power for all four wheels in unison, when the switches 3, 4, 5 and 6 are in the standard position. Switches 3, 4, 5 and 6 are provided to drive each set of wheels individually, for example, to power assist in moving the legs sideways or in extending the legs. Also, as conditions may dictate, the switches may be separately actuable to relieve the load on cylinders 60 or to switch to a one, two, three or four wheel drive. The latter functions may be accomplished by leaving switch 192 in the "off" position and actuating any combination of switches 3, 4, 5 and 6 to forward or reverse positions as desired.

Torque/current limiting variable resistors 7, 8, 9 and 10 are each disposed in series with a drive motor 92. The resistors 7, 8, 9 and 10 limit the power available to each drive motor 92 and prevent motor burnout in case the wheels 90 are prevented from turning. The resistors 7, 8, 9 and 10 also balance the total torque to the other drive motors in the event the load upon one or more motors 92 is greater than the load upon the others.

In one exemplary embodiment of the invention, drive motors 92 may be D.C., reversible, and of the variable speed permanent magnet type. The D.C. motors 92 can be reduced in speed sixty percent (60%) without losing rated torque. The variable speed components are not shown, but they may be known components. In one embodiment, the wheel diameter of wheels 90, the variable speed components, and the drive motors 92 are designed to provide a speed of about 1.4 miles per hour for the prime mover 10, and a creep speed of about seven revolutions per minute. The variable speed components have some free wheeling latitude built into them when all electrical power is off. The drive motors 92 are preferably double shafted. One shaft end will be secured to the drive train and the other shaft end will have an electrical brake mounted on it. The electrical brake would be released if the free wheeling aspect of the gear reducer and drive motor was required. Modifications in design of the electric drive motors may be made, as will be apparent to those skilled in the art. A hydraulic drive means may be employed in place of the electric motor and gear reducer with attendant suitable modification of the controls.

From the foregoing, it is believed evident that the present invention provides a truly versatile prime mover having advantages not present in similar known devices. While a presently preferred embodiment of the invention has been shown and described, it will be obvious to those skilled in the art that changes may be made within the scope of the following claims.

We claim:

1. A prime mover comprising a central housing, a plurality of elongated legs, mounting means for mounting said legs on said central housing so as to permit movement of the legs both up and down and sideways relative to the central housing, drive means on each of said legs, control means for independently actuating each of said drive means for moving the central housing, said legs being adapted to be positioned so as to stabilize the orientation of the central housing, said mounting means including first pivot means for enabling movement of the legs up and down relative to the central housing and second pivot means for enabling movement of the legs sidewise relative to the central housing, and third pivot means on said legs for enabling movement of the drive means inwardly and outwardly with respect to the central housing.

2. A prime mover as in claim 1 wherein each elongated leg is comprised of a plurality of articulated sections.

3. A prime mover as in claim 1 wherein each elongated leg is comprised of a plurality of sections, said third pivot means connecting adjacent sections, and actuating means for moving the adjacent sections relative to one another.

4. A prime mover as in claim 3 wherein the actuating means comprise cylinder means connected to adjacent sections.

5. A prime mover as in claim 1 including actuating means connected between the central housing and the legs for moving the legs sidewise.

6. A prime mover as in claim 5 including four legs secured to said central housing.

7. A prime mover as in claim 1 wherein said drive means includes a king pin journaled to a section of each leg, frame means secured to the stub shaft for rotation therewith, ground support means rotatably supported on the frame means, and rotating means operatively connected to said ground support means for rotating same, whereby the frame means are positioned to properly orient the ground support means.

8. A prime mover as in claim 1 including power means on said central housing and means connecting said power means to said drive means on each leg for actuating same.

9. A prime mover as in claim 1 including a pair of telescoping sections in at least one of said legs for adjusting the effective length thereof.

10. A prime mover as in claim 9 including actuating means for moving the telescoping sections relative to one another.

11. A prime mover as in claim 1 wherein the control means includes switch means for selecting modes of prime mover operation.

12. A prime mover as in claim 11 including a synchro associated with the second pivot means for providing an electrical signal in response to the displacement of the leg about the second pivot means.

13. A prime mover as in claim 11 including means for rotatably supporting the drive means for rotation about a driving axis and about a steering axis.

14. A prime mover as in claim 13 including a synchro associated with the means for rotatably supporting the drive means for providing an electrical signal in response to rotation of the drive means about the steering axis.

15. A prime mover as in claim 13 including a hydraulic rotary actuator for rotating the drive means about the steering axis.

16. A prime mover as in claim 12 including a bracket supporting the synchro and clamp means for enabling rotatable adjustment of the synchro relative to the bracket.

17. A prime mover as in claim 14 including a bracket supporting the synchro and clamp means for enabling rotatable adjustment of the synchro relative to the bracket.

18. A prime mover as in claim 1 including fourth pivot means on the legs connected to the drive means for pivoting the drive means about a generally vertical axis when the elongated legs are extended, said drive means including rotatable ground support means, electric motor means for rotating the ground support means, said control means including first control means controlling the pivoting of the drive means about said generally vertical axis for controlling the steering of the prime mover and second control means for controlling the electric motor means to control rotation of the ground support means in the selected steering operation.

19. A prime mover comprising a central housing, a plurality of elongated legs, mounting means for mounting said legs on said central housing so as to permit movement of the legs both up and down and sideways relative to the central housing, drive means secured on each of said legs, control means for independently actuating each of said drive means for moving the central housing, the mounting means including first pivot means for enabling movement of the legs up and down relative to the central housing and second pivot means for enabling movement of the legs sidewise relative to the central housing, and third pivot means on the legs for enabling a portion thereof carrying the drive means to be moved inwardly and outwardly with respect to the central housing, first actuating means for moving the legs up and down, second actuating means for moving the legs sideways, third actuating means for moving said portion inwardly and outwardly with respect to the central housing, said legs being adapted to be positioned so as to stabilize the orientation of the central housing, said legs being adapted to be positioned so as to stabilize the orientation of the central housing on a variety of surfaces and said drive means operable to move the prime mover over a variety of surfaces.

* * * * *